Oct. 28, 1969     H. KREIENBAUM ET AL     3,474,610

HAY-HANDLING MACHINE

Filed Dec. 1, 1966     2 Sheets-Sheet 1

Inventors:
Hubert KREIENBAUM
and Wilhelm AHLER
by: Arthur O. Klein,
their Attorney Inventors:
Hubert KREIENBAUM
and Wilhelm AHLER
by Arthur O. Klein
their Attorney United States Patent Office 3,474,610
Patented Oct. 28, 1969

3,474,610
HAY-HANDLING MACHINE
Hubert Kreienbaum and Wilhelm Ahler, Stadtlohn, Westphalia, Germany, assignors to Wilhelm Kempner, Stadtlohn, Westphalia, Germany, a firm
Filed Dec. 1, 1966, Ser. No. 598,316
Claims priority, application Germany, Dec. 2, 1965, K 57,809; Sept. 13, 1966, K 60,240
Int. Cl. A01d 79/02
U.S. Cl. 56—372                                                 6 Claims

ABSTRACT OF THE DISCLOSURE

A rotary hay fork for use in a hay-handling machine, the rotary hay fork including a plurality of fork-teeth and a rotary means which carries the teeth for rotation with the rotary means. The rotary means supports each tooth for free swinging movement about a given axis which is parallel to the axis of rotation of the rotary means, and each tooth of the rotary hay fork is capable of swinging through 360° about the above given axis with respect to the rotary means without engaging the latter.

---

Thus, the present invention relates to a hay-handling machine which includes a rotary body which has a substantially horizontal axis of rotation and which carries the teeth of the hay fork, the rotary body being driven through any bevel-gear drive and through a chain or belt drive from the power take-off shaft of a tractor which pulls the hay-handling machine. Machines of this general type as constructed up to the present time have a number of disadvantages.

Thus, in one type of known hay-handling machine there is a rotary hay fork having fork teeth which are fixed to a rotary body for rotation therewith. These teeth break off too quickly as a result of the unavoidable engagement between the teeth and the ground, and the teeth which are broken away in this way remain in the crops and result thereafter, when the crops are gathered with a straw cutter or a suitable press, very often in considerable damage or breakage of equipment.

Furthermore, there are known hay-handling machines where the teeth of the rotary fork are carried by a rotary body for a limited extent of free swinging movement relative thereto. As a result of this possibility of free swinging movement, the teeth of the fork are indeed capable of yielding, but only within a certain region, this construction conventionally having stops which limit the swinging movement of the fork teeth in both directions. The striking of the fork teeth against the stops results in a considerable amount of noise which can be avoided by providing elastic rubber or plastic supports for the stops. However, it quite often happens that the striking of the forks against the stops results in damage to the rotary body.

Finally, there are known machines where the rotary body carriers fork teeth in the form of elongated elastic bars made of plastic and carrying at their outer ends metal tips. These plastic bars also break after a certain period of operation and provide with their steel tips during the subsequent gathering of the crops the same disadvantages which have been referred to above.

It is therefore a primary object of the present invention to provide in a hay-handling machine a rotary hay fork construction which will avoid the above drawbacks.

In particular, it is an object of the invention to provide a construction where the teeth of the rotary hay fork are capable of yielding when striking an obstacle of any type without however any possibility of breaking off of the fork teeth from the rotary body which carries the latter.

A further problem encountered with conventional constructions of the above type resides in the fact that the stalks become wound around the structure to prevent proper operation thereof, and it is accordingly a further object of the present invention to provide a construction which will avoid any hampering in the operations by the stalks of hay which are acted upon by the machine of the invention.

Also, the cost of manufacture of the conventional constructions of the above type is quite high because it includes a number of individual elements which must be carefully assembled in a precise manner, resulting in undesirable unbalance of the rotary hay fork even if the parts are assembled with great care.

It is still another object of the present invention to provide on the one hand a construction which is considerably less expensive than conventional constructions and which on the other hand is capable of achieving in a simple way a dynamic balance without all of the complications required by the conventional construction in the assembly of the components thereof.

In accordance with the invention the hay-handling machine is provided with a rotary hay fork which includes a plurality of fork teeth and a rotary means having a substantially horizontal axis of rotation and carrying the fork teeth for rotation therewith about this substantially horizontal axis of rotation. In addition the rotary means of the invention is operatively connected with the teeth to support each tooth for rotary movement about a given axis through 360° with respect to the rotary means without engaging the latter, so that in this way each tooth of the rotary fork of the invention is capable of freely swinging with respect to the rotary means without any damage to the structure.

The invention is illustrated by way of example in the accompanying drawings which form part of this application and in which.

The rotary hay fork of the present invention may form part of a hay-handling machine such as a hay sweep used, for example, to collect hay from windrows, the machine being drawn by a suitable tractor having a power take-off shaft from which the power is derived for operating the hay-handling machine.

Figure 1:
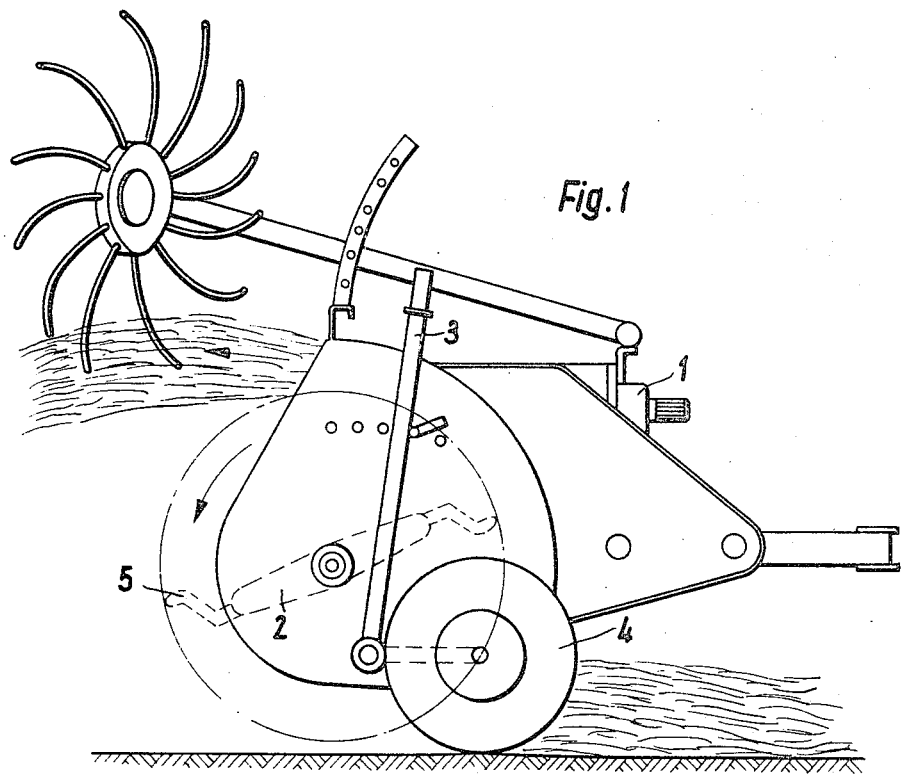
FIG. 1 is a schematic side elevation of one possible embodiment of a machine according to the present invention.
Figure 4:
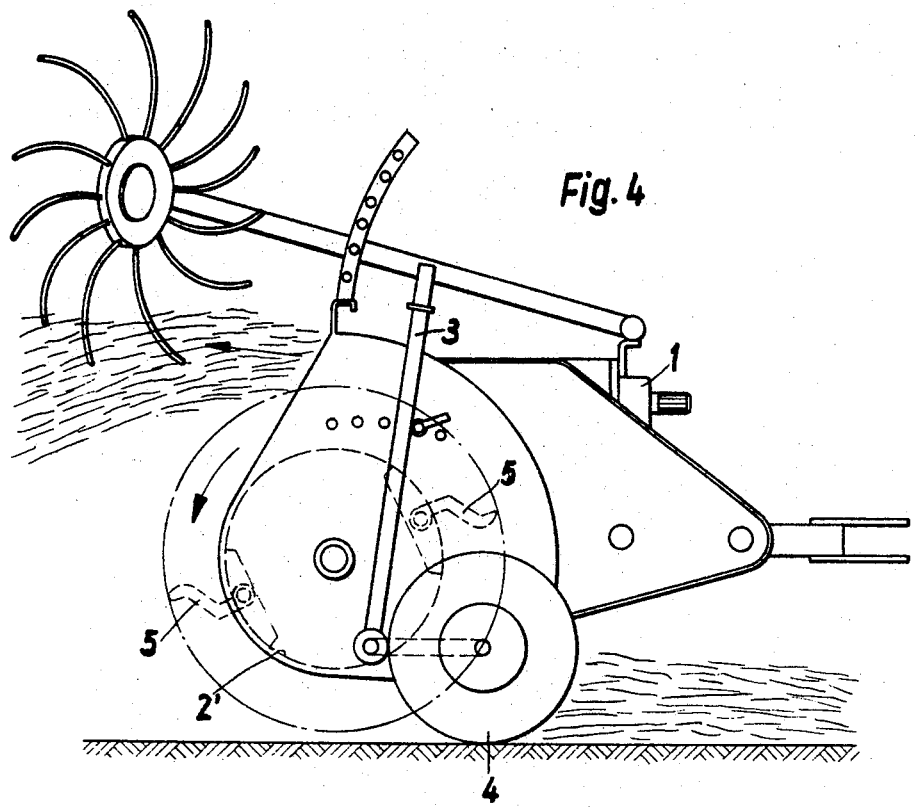
FIG. 4 is a schematic side elevation of another embodiment of a hay-handling machine according to the invention.

The basic construction of the machine and its operation is apparent from FIGS. 1 and 4. From the power take-off shaft of an unillustrated tractor there is provided, by way of a known motion-transmitting linkage and a bevel-gear drive 1, transmission of a drive to a sprocket chain or pulley drive situated at one side of the machine and not illustrated in the drawings, this latter drive being used to rotate the rotary means 2 of FIG. 1 or the rotary means 2' of FIG. 4 about a substantially horizontal axis. Each of these rotary means includes a rotary body and a central shaft which extends along the horizontal axis of rotation and carries the rotary body. The machine is carried on wheels 4 and a suitable linkage system 3 is operatively connected with the shaft of the wheels 4 so as to be capable of adjusting the elevation of the machine with respect to the ground which is engaged by the wheels 4. Thus, by way of the adjusting linkage 3 the elevation of the entire machine can be regulated. The rotary means 2 or 2′ carries a plurality of fork teeth 5, and unevenness in the ground situated between the wheels 4 is capable of being compensated for by the fork teeth 5 which are pivotally carried by the rotary means 2 or 2′ for free rotation with respect thereto. Both the configuration and the operation of the teeth 5 are described in greater detail below.

Figure 3:
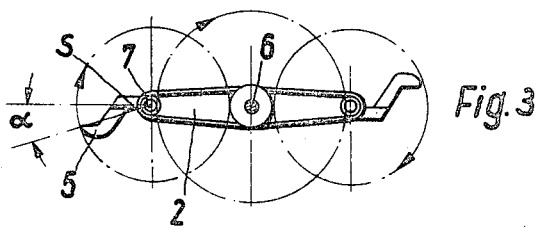
FIG. 3 is a transverse sectional elevation of the structure of FIG. 2 taken along line III—III of FIG. 2 in the direction of the arrows.
Figure 2:
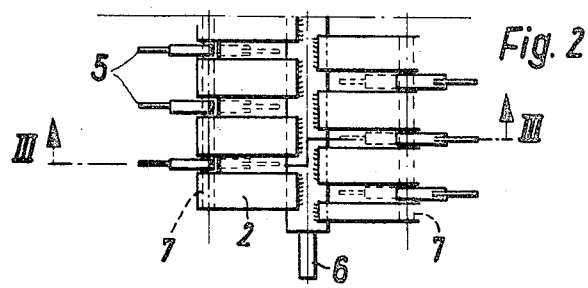
FIG. 2 is a fragmentary plan view of the rotary hay fork which forms part of the machine in FIG. 1.

With the embodiment of the invention which is illustrated in FIGS. 1–3, the rotary means includes a rotary body made up of a plurality of individual curved sheet members of substantially U-shaped or hair-needle configuration, this rotary means including the elongated shaft 6 whose axis coincides with the axis of rotation of the rotary means 2, and the several substantially U-shaped members having free ends welded or otherwise fixed directly to the rotary shaft 6 for rotation therewith, as is apparent from FIGS. 2 and 3. Thus, the plurality of individual U-shaped elements which are fixed at their free ends to the central shaft 6 provide the rotary means 2 with a substantially flat wing-shaped configuration, as is apparent from FIG. 3. Each of these individual U-shaped elements is formed from a piece of sheet metal, for example, and it is curved so that the outer ends of one row of these U-shaped elements extend along a common axis which is diametrically opposed to and situated at the same distance from the shaft 6 as the outer ends of the other row of U-shaped elements.

The row of U-shaped elements on one side of the shaft 6 extend around and are fixed at their outer ends to an elongated shaft 7 which has an axis defining one axis of rotation for one row of fork teeth 5, while the other row of U-shaped elements extend at their outer ends around and are fixed to a second shaft 7 which is parallel to the first shaft 7 and located at the same distance as the latter from the central shaft 6, the shaft 6 and both of the shafts 7 having their axes situated in a common plane. Each tooth 5 is provided at its inner end with an eye through which the shaft 7 passes and in this way each tooth is supported between a pair of successive U-shaped elements for free swinging movement about the shaft 7 which defines a given axis for rotary movement of each tooth 5 with respect to the rotary means 2, while at the same time the teeth 5 are constrained to rotate with the rotary means 2 about its axis of rotation which coincides with the axis of the central shaft 6.

As is apparent from FIGS. 2 and 3, the distance of the shaft 7 from the shaft 6 is great enough to provide for each tooth 5 free swinging through 360° without engaging the shaft 6. This operation is particularly apparent from FIG. 3. As may be seen from FIG. 2, the U-shaped elements and teeth 5 of one row are axially offset with respect to the U-shaped elements and teeth 5 of the other row.

Figure 5:
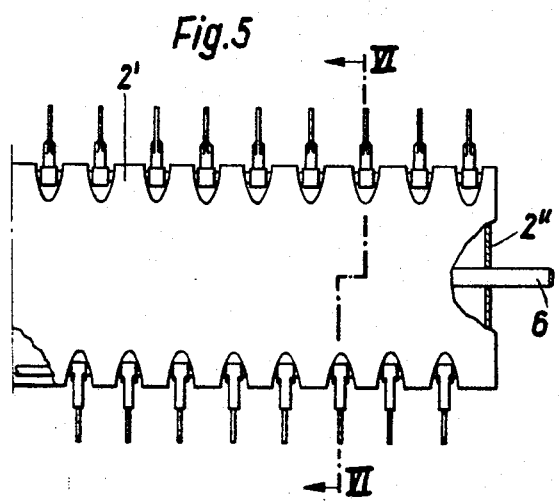
FIG. 5 is a fragmentary top plan view of the rotary hay fork of the machine of FIG. 4.
Figure 6:
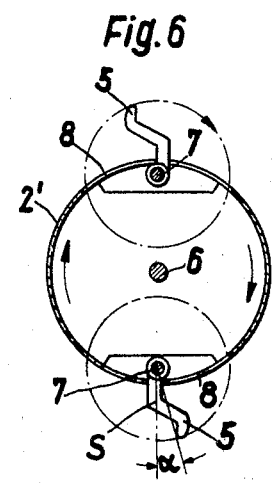
FIG. 6 is a transverse section of the structure of FIG. 5 taken along line VI—VI of FIG. 5 in the direction of the arrows.

Although the above-described structure of FIGS. 1–3 will to some extent achieve the results of the invention, nevertheless it possesses certain disadvantages which are referred to below, and in fact the embodiment of the invention which is shown in FIGS. 4–6 is preferred. This embodiment of the invention which is shown in FIGS. 4–6 includes a rotary means 2′ in the form of an elongated hollow cylindrical drum having a pair of opposed end walls 2″ which are fixed to and carried by the central shaft 6 whose axis coincides with the axis of rotation of the drum 2′. The end walls 2″ are respectively situated in planes which are normal to the axis of the shaft 6, and the rotary body 2′ has an outer cylindrical wall fixed to the peripheries of the end walls 2″ for rotation together with the latter and the shaft 6.

As is apparent particularly from FIG. 6, the cylindrical drum wall fixedly carries at its inner surface a pair of elongated shafts 7 which are parallel to the shaft 6 and which are situated at diametrically opposed parts of the drum, with the pair of shafts 7 and the shaft 6 all having axes located in a common plane. One row of fork teeth 5 is pivotally supported on one shaft 7 for free swinging movement about the latter while the other row of fork teeth 5 is pivotally supported on the other shaft 7 for free swinging movement about the latter, and for this purpose each tooth 5 has at its inner end an eye or other opening through which the shaft 7 passes so that each tooth is pivotally supported for free swinging movement about a shaft 7. The cylindrical drum which together with the end walls 2″ forms the rotary means 2′ is formed with a plurality of slots 8 passing therethrough, a slot 8 being provided for each tooth 5 and being large enough to provide for each tooth 5 the possibility of freely swinging through 360° about its supporting shaft 7 without engaging the rotary means 2′, as is particularly apparent from the arrows and dot-dash circles shown in FIG. 6. Moreover, as was the case with the embodiment of FIGS. 1–3, the slots 8 and teeth 5 of one row are axially offset with respect to the slots 8 and teeth 5 of the other row.

With both of the above-described embodiments of the invention each tooth 5 is constructed in such a way that its center of gravity S is situated angularly in advance of its outer lip, in the direction of rotation of the rotary means 2 or 2′, so that there is defined between a straight line extending through the center of gravity and the axis of rotation of each tooth and a straight line extending through the tip of each tooth and its axis of rotation an angle α which is greater than 15°. In this way each tooth 5, as it rotates with the rotary means about the axis of the shaft 6, if it should during the operations engage the ground, a grass pit, a stone, or the like, is capable of swinging rearwardly as much as required and after passing beyond the obstruction will as a result of centrifugal force be directed back to its outer operative position with respect to the rotary means.

When the machine is at a standstill with one row of teeth situated at an upper portion of the rotary means over the axis thereof, for example, it is possible for the teeth to freely swing so as to hang downwardly from a shaft 7 which is situated over the shaft 6, for example. All noise which might occur during operation of the machine or when the machine is stationary is prevented because of the capability of the fork teeth to swing freely through 360° with respect to the rotary means without engaging the latter. Of course, as soon as the rotary means is set into rotation about the axis of the shaft 6 all of the teeth will, due to centrifugal force, swing outwardly to their operative positions.

Thus, with the structure of the invention it is possible for each fork tooth to swing freely with respect to the rotary means in any direction without striking against any other element, and when a foreign obstacle such as a stone or the like is contained in the crops and engaged by a fork tooth, it is possible for the fork tooth to swing completely around a full circle while the centrifugal force will, as soon as the tooth is released from the obstacle, return the tooth to its operative position. The weight of the fork teeth is chosen in such a way that the centrifugal force acting thereon is sufficiently great to pull the hay or other treated crops apart from each other.

As a result of the above-described arrangement of the center of gravity with respect to the outer tip of each tooth, providing the angle α which is greater than 15°, the tip of each fork tooth is not stressed by the weight of the tooth and enables each tooth when it engages unevenness in the ground or the like to be quickly raised with only a relatively small angle of turning of each tooth in order to compensate for the unevenness in the ground.

With the embodiment of FIGS. 1–3 the rotary means has a substantially wing-shaped configuration, as pointed out above. The hollow structure of this wing-shaped rotary means provided by the separate U-shaped elements provides an improvement in the flow of air through the rotary means and achieves a blowing action. In this way the air movement is superior to that which is achieved with a closed wing structure, and this improved air movement provides advantages with respect to the distribution of the goods such as the hay or the like.

However, as was pointed out above, the embodiment of FIGS. 4–6 is preferred because the use of a cylindrical drum having closed ends prevents, above all, the winding of the stalks of hay, which may have a length on the order of 125 cm., onto the parts of the structure thus rendering the operation thereof difficult to carry out. With the wing-shaped rotary body of FIGS. 1–3 it is possible for the stalks to wind themselves onto the structure since the diameter of the outer ends of the U-shaped members will in all cases be smaller than the longest possible length of the stalks which will be encountered.

Furthermore, the manufacture of the embodiment of FIGS. 1–3 is considerably more expensive than that of FIGS. 4–6 because the individual U-shaped elements must first be curved into a substantially hair-needle configuration from pieces of sheet metal and then these individual elements must be fixed to the rotary shaft 6, resulting quite easily in difficulties with respect to the dynamic balance of the apparatus. These latter difficulties as well as the possibility of winding of the stalks onto the rotary fork structure are avoided by the use of the rotary drum for the body of the rotary means of FIGS. 4–6, and it is for these reasons that the latter construction is preferred.

What is claimed is:

1. In a hay-handling machine, a rotary hay fork comprising a plurality of elongated fork teeth and rotary means having a substantially horizontal axis of rotation and carrying said teeth for rotation therewith, said rotary means including a substantially wing-shaped body formed with a plurality of cut-outs through which said teeth can freely swing, said wing-shaped body being operatively connected to said plurality of teeth for supporting each tooth thereof for free rotary movement without engaging said body about a given axis.

2. The combination of claim 1 and wherein each fork tooth has an outer tip distant from said given axis and a center of gravity situated between said tip and said given axis, said center of gravity being situated angularly in advance of said tip of each tooth in the direction of rotation thereof with said rotary means, and the angle between a line drawn from said center of gravity of each tooth to said given axis and a line drawn from said tip of each tooth to said given axis being greater than 15°.

3. The combination of claim 1 and wherein a hollow interior of said body being open and communicating with the outer atmosphere so that air can flow therethrough to provide a blowing action.

4. The combination of claim 1 and wherein said wing-shaped body has a substantially central axis of rotation, and said given axis being situated on one side of and extending parallel to said axis of rotation with a plurality of said teeth being arranged along said given axis for free swinging movement about the latter with respect to said wing-shaped body, said wing-shaped body carrying a first pivot shaft which extends along said given axis to support said teeth for rotation about said pivot shaft and having, diametrically opposed to said first pivot shaft, a second pivot shaft parallel to said first pivot shaft and situated at the same distance from said axis of rotation of said body as said first pivot shaft, and a plurality of additional fork teeth carried for free swinging movement about said second pivot shaft, said body being formed with cut-outs large enough to provide for each tooth a free swinging movement through 360° about its pivot shaft with respect to said body.

5. The combination of claim 4 and wherein the teeth which are carried by one of said pivot shafts are axially offset with respect to the teeth carried by the other of said pivot shafts.

6. The combination of claim 5 and wherein said body includes an elongated central shaft extending along said axis of rotation thereof and a plurality of substantially U-shaped members fixed to and extending from said central shaft in opposite directions, said U-shaped members terminating distant from said central shaft in outer ends which extend around said pivot shafts and which fixedly carry the latter and said U-shaped members being axially spaced from each other to define said cutouts through which said teeth can freely swing.

References Cited

UNITED STATES PATENTS

| 2,529,422 | 11/1950 | Sampson | 56—372 |
| 2,559,862 | 7/1951 | Ferguson | 56—372 |
| 2,841,946 | 7/1958 | Skromme et al. | 56—29 |

FOREIGN PATENTS

| 83,887 | 7/1957 | Denmark. |

RUSSELL R. KINSEY, Primary Examiner

UNITED STATES PATENT OFFICE
CERTIFICATE OF CORRECTION

Patent No. 3,474,610                                  October 28, 1969

Hubert Kreienbaum et al.

It is certified that error appears in the above identified patent and that said Letters Patent are hereby corrected as shown below:

In the heading to the printed specification, line 5, "Kempner" should read -- Kemper --.

Signed and sealed this 15th day of December 1970.

(SEAL)
Attest:

Edward M. Fletcher, Jr.                      WILLIAM E. SCHUYLER, JR.
Attesting Officer                                 Commissioner of Patents